(12) United States Patent
Lin

(10) Patent No.: US 6,983,550 B1
(45) Date of Patent: Jan. 10, 2006

(54) GAS HOT AIR GUN

(76) Inventor: Arlo Lin, Akara Building, 24 De Castro Street, Wickhams Cay I, Road Town, Tortola (VG)

( * ) Notice: Subject to any disclaimer, the term of this patent is extended or adjusted under 35 U.S.C. 154(b) by 0 days.

(21) Appl. No.: 10/899,699

(22) Filed: Jul. 26, 2004

(51) Int. Cl.
*A45D 1/00* (2006.01)
(52) U.S. Cl. .................. 34/96; 431/344; 432/222
(58) Field of Classification Search .......... 431/153, 431/343, 344, 345; 219/261; 392/385; 34/96; 432/222

See application file for complete search history.

(56) References Cited

U.S. PATENT DOCUMENTS

| | | | |
|---|---|---|---|
| 4,726,767 A | * | 2/1988 | Nakajima ............... 432/222 |
| 5,009,592 A | * | 4/1991 | Roldan et al. .......... 432/222 |
| 5,155,925 A | * | 10/1992 | Choi .......................... 34/97 |
| 5,649,824 A | * | 7/1997 | Stagg et al. ............. 432/222 |
| 5,937,139 A | * | 8/1999 | Peterson ................. 392/307 |
| 6,457,628 B1 | * | 10/2002 | Lin ........................ 228/20.1 |

FOREIGN PATENT DOCUMENTS

TW 286505 9/1996

* cited by examiner

*Primary Examiner*—S. Gravini
(74) *Attorney, Agent, or Firm*—Alan D. Kamrath; Nikolai & Mersereau, P.A.

(57) ABSTRACT

A gas hot air gun includes a main body, an ignition device, a switch set and a safety switch. The main body includes a blower, a nozzle, a barrel and a handle. A heating chamber and a mixing chamber are on the inner front of the barrel. A gas can is inside the handle. One end of the nozzle is connected to the gas can. The switch set includes a power switch, with the safety switch closing power of the battery set or gas flow of the gas can under some pre-set conditions. Users press the power switch and have gas spray out from the nozzle into the heating chamber to generate heat. The blower sends hot air in the heating chamber out of the main body. A metal slice regulating the direction of air and a catalyst for avoiding flame extending out of the nozzle area are inside the heating chamber.

22 Claims, 6 Drawing Sheets

GAS HOT AIR GUN

BACKGROUND OF THE INVENTION

I. Field of the Invention

This invention relates generally to a hot air gun and, more specifically, to a gas hot air gun that offers smaller physical size for users to carry around, complete burn of gas to reduce carbon monoxide and faster cooling down the whole set after application to prevent users from danger of burning, with a safety switch stopping power or gas flow under some pre-set conditions for safety purposes.

II. Description of the Prior Art

Heretofore, it is known that the "Internal structure of a hot air gun" of Taiwan Patent No. 286505 comprises a main body 1, a handle 2 and a power supply 3. The main body 1 connects to the handle 2 with a hinge 11. The main body further comprises a motor 14, a fan 15 on the motor axis 141 of the motor 14, and a fan blade 16 on the front of the fan 15. A burning chamber 161 is beneath the fan blade 16. An ignition tube 17 interlinks to the burning chamber 161. A temperature control switch 18 and a control rod 19 are installed inside the ignition tube 17. A power supply 3 and gas can are inside the handle 2. A flow control knob 23 is on top of the handle 2. A flame nozzle 24 is on the front of the flow control knob 23. The flame nozzle 24 is ignited inside the burning chamber 161 beneath the fan blade 16. A press button 25 and a switch 26 are installed on the handle to ignite the gas and turn the motor 14 on.

Many drawbacks exist on the known gas hot air gun. The flame burns the gas in the burning chamber 161 beneath the fan blade 16 after the gas is ignited, and hot air is blown out by the fan blade 16 of the fan 15. However, the flame inside the burning chamber 161 is blown out easily and burn users, and thus is not very safe. The temperature control switch 18 reduces the gas quantity after the temperature is high, and when the temperature is low, the gas quantity is increased to have a larger flame. However, such design introduces incomplete burning of gas so that the air injected might contain large quantity of carbon monoxide. Thus, it is very dangerous for users to apply the equipment in a sealed environment.

SUMMARY OF THE INVENTION

It is therefore a primary objective of the invention to provide a gas hot air gun that improves known hot air guns.

In order to achieve the objective set forth, a gas hot air gun in accordance with the present invention comprises a main body, an ignition device, a switch set and a safety switch. The main body comprises a blower and a nozzle. The main body has a barrel and a handle. A heating chamber and a mixing chamber are on the inner front of the barrel. A battery set and a gas can are inside the handle. One end of the nozzle is connected to the gas can. The switch set comprises a power switch and an ignition switch. The safety switch connects to the switch set electrically. The safety switch closes power of the battery set or gas flow of the gas can under some pre-set conditions. Users press the power switch and have gas spray out from the nozzle into the heating chamber to generate heat, with the blower sending hot air in the heating chamber out of the main body. A metal slice regulating the direction of air and a catalyst for avoiding flame extending out of the nozzle area are inside the heating chamber. The present invention is small in size and easy for users to carry.

BRIEF DESCRIPTION OF THE DRAWINGS

The accomplishment of the above-mentioned objective of the present invention will become apparent from the following description and its accompanying drawings which disclose an illustrative embodiment of the present invention and which are as follows.

DESCRIPTION OF THE PREFERRED EMBODIMENT

Figure 1:
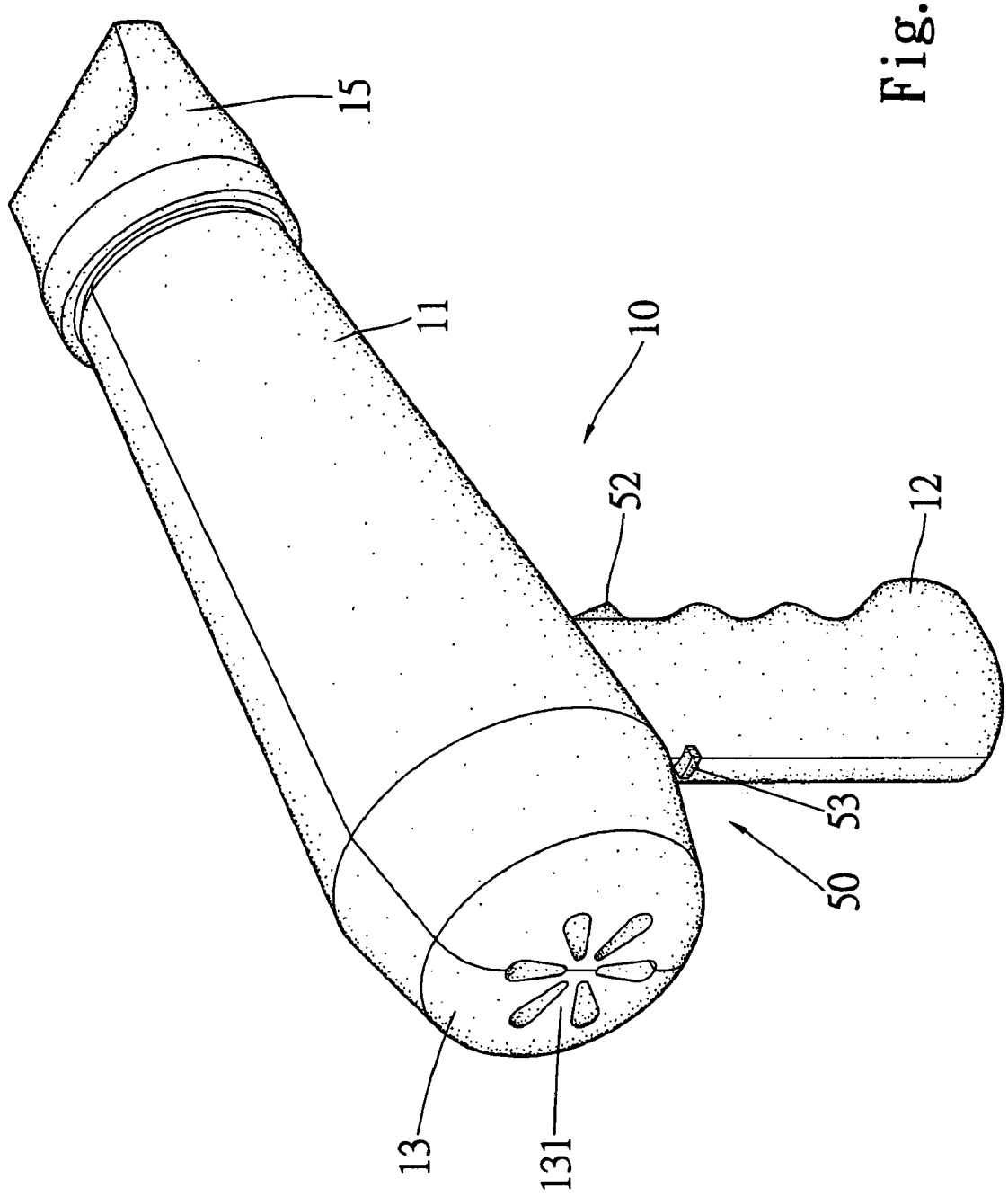
FIG. 1 is a perspective view of the present invention.
Figure 2:
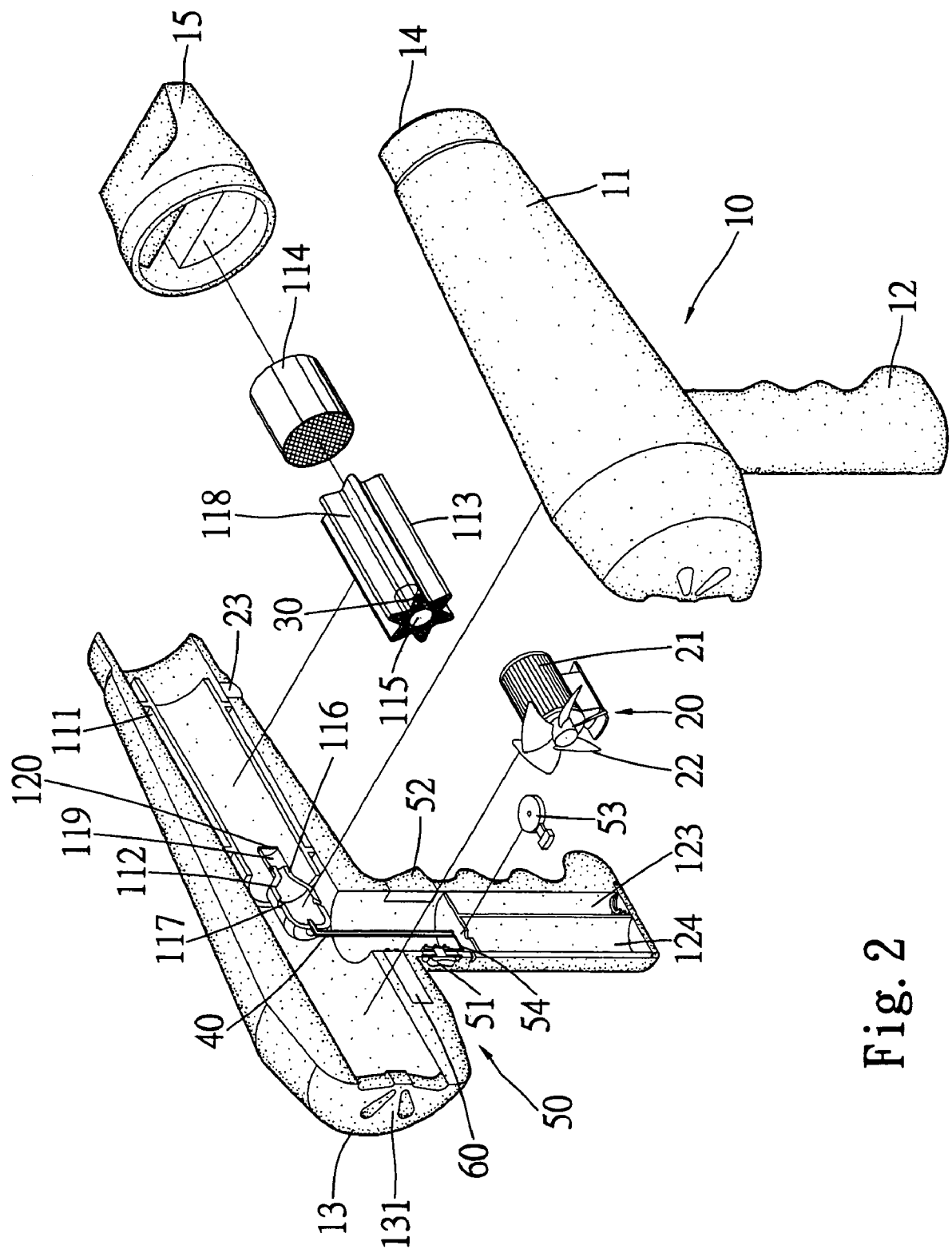
FIG. 2 is an exploded perspective view of the present invention.
Figure 3:
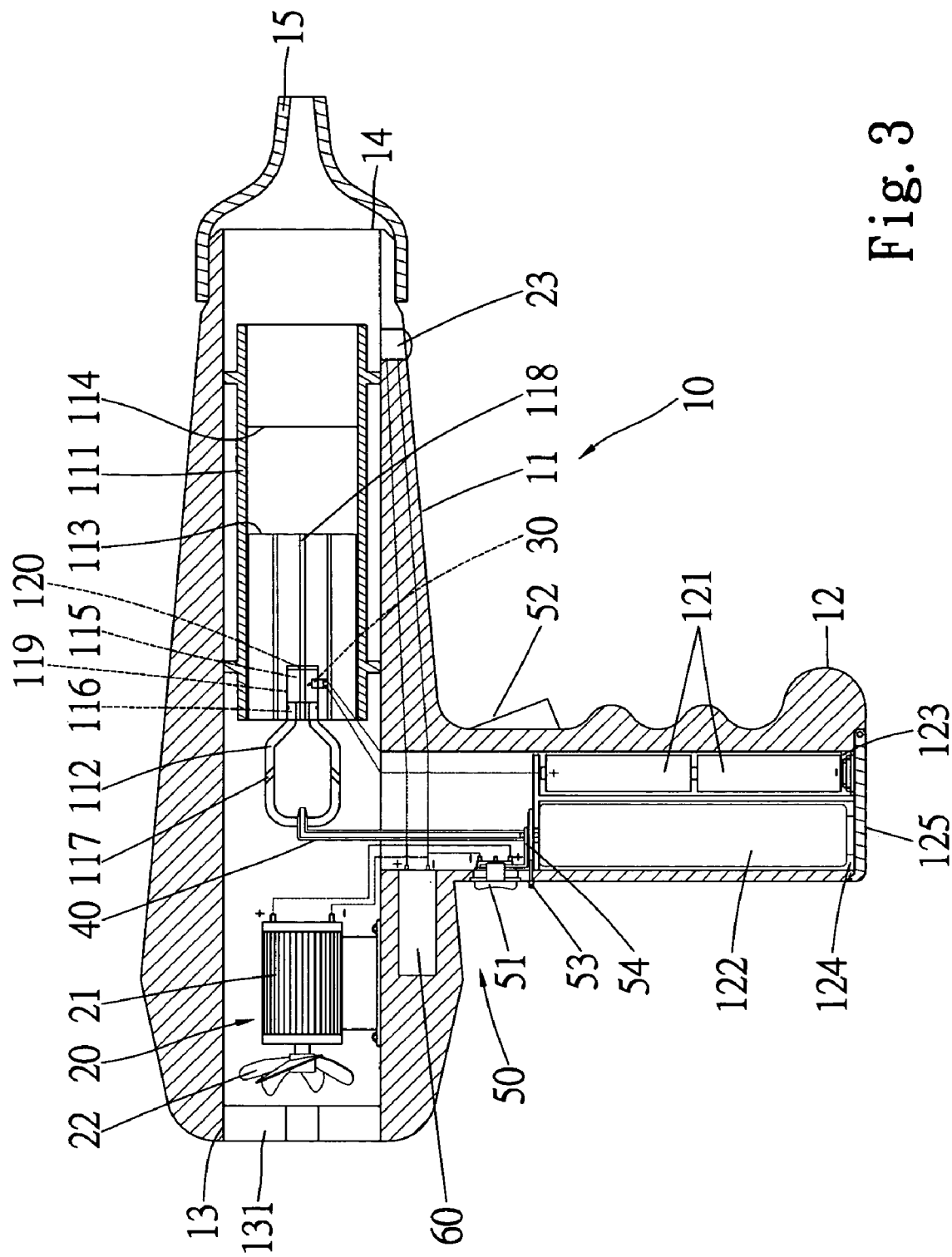
FIG. 3 is a cross-sectional view of the present invention.

Referring to FIG. 1 to FIG. 6, the present invention comprises a main body 10, an air blower 20, an ignition device 30, a nozzle 40, a switch set 50 and a safety switch 60. The main body 10 consists of a barrel 11 and a handle 12. A heating chamber 111 is inside the barrel 11. A gas can 122 is inside the handle 12. Users can press the switch set 50 to start the safety switch 60 and have the gas of the gas can 122 spray out from the nozzle 40 into the heating chamber 111. The ignition device 30 ignites the gas inside the heating chamber 111 to generate a heat source. The air blower 20 blows the hot air inside the heating chamber 111 externally to the main body 10.

The main body 10 comprises an intake 13 and a exhalation hole 14. The heating chamber 111 and a mixing chamber 112 are on the inner front of the barrel 11. A daisy shaped metal slice 113 and a catalyst 114 are inside the heating chamber 111. The metal slice 113 is installed inside the heating chamber 111 near the front side of the barrel 11. The catalyst 114 is installed near the end of the barrel 11. A burning chamber 115 is inside the metal slice 113. The mixing chamber 112 is installed in the barrel 11 opposite to the location of the heating chamber 111. A shrink 116 near the metal slice 113 is formed on one end of the mixing chamber 112. The shrink 116 is interlinked to the burning chamber 115 of the metal slice 113. Several air inhalation holes 117 are around the mixing chamber 112. Passages 118 are between the metal slice 113 and the barrel 11. A tube shaped metal net 119 controlling the mixing air flow is installed between the burning chamber 115 of the metal slice 113 and the shrink 116 of the mixing chamber 112. A thicker metal net 120 with smaller net holes near the exhalation hole 14 is on one side of the metal net 119.

The handle 12 is connected to and beneath the barrel 11. A first container 123 and a second container 124 are inside the handle 12. A battery set 121 and the gas can 122 are inside the first and the second containers 123, 124, respectively. The gas can 122 contains burnable fluid, usually liquid gas. A movable cover 125 is on the bottom of the handle 12 to cover the first and the second container 123, 124. The intake 13 is installed on the end of the barrel 11 for air to flow into the barrel 11. Several protective grids 131 are on the intake 13 to prevent users from inserting their fingers in. The exhalation hole 14 is on the front of the barrel 11 to expel air from the barrel 11. A holder 15 is installed on the front of the barrel 11 for faster heating effect.

The air blower 20 is installed internally on the end of the barrel 11 to draw air from the intake 13 into the barrel 1. The blower 20 comprises a motor 21, such as a DC motor in this application, and a fan blade 22. The motor 21 is located near one side of the exhalation hole 14. The fan blade 22 is installed on the motor 21 and near one side of the intake 13 to be driven by the motor 21. A temperature sensor 23 is installed around the barrel 11 near the heating chamber 111 and the exhalation hole 14. The temperature sensor 23 controls the motor 20. Specifically, after the end of the application and when the temperature of the heating chamber 111 is below a certain temperature, the temperature sensor 23 stops the motor 21 from turning.

The ignition device 30 is installed inside the metal slice 113 of the heating chamber 111 to ignite the mixed gas in the heating chamber 111. The ignition device 30 is installed inside the burning chamber 115 of the metal slice 113 in this application.

The nozzle 40 is installed inside the barrel 11 of the main body 10 and located between the air blower 20 and the mixing chamber 112. One end of the nozzle 40 is connected to the gas can 122.

The switch set 50 is installed inside the handle 12 of the main body 10 near the barrel 11. The switch set 50 comprises a power switch 51, a control rod 52, an ignition switch 53 and a regulation valve 54. The control rod 52 controls opening and closing the gas can 122. The ignition switch 53 connects to the ignition device 30 with electrical wires. The regulation valve 54 is installed on the gas can 122 to control the gas flow amount of the gas can 122.

The safety switch 60 is connected to the power switch 51, the motor 21, the temperature sensor 23 of the air blower 20, the battery set 121 on the handle 12 and the control rod 52 of the switch set 50, with all these components being controlled by the safety switch 60 to turn on and off.

Figure 4:
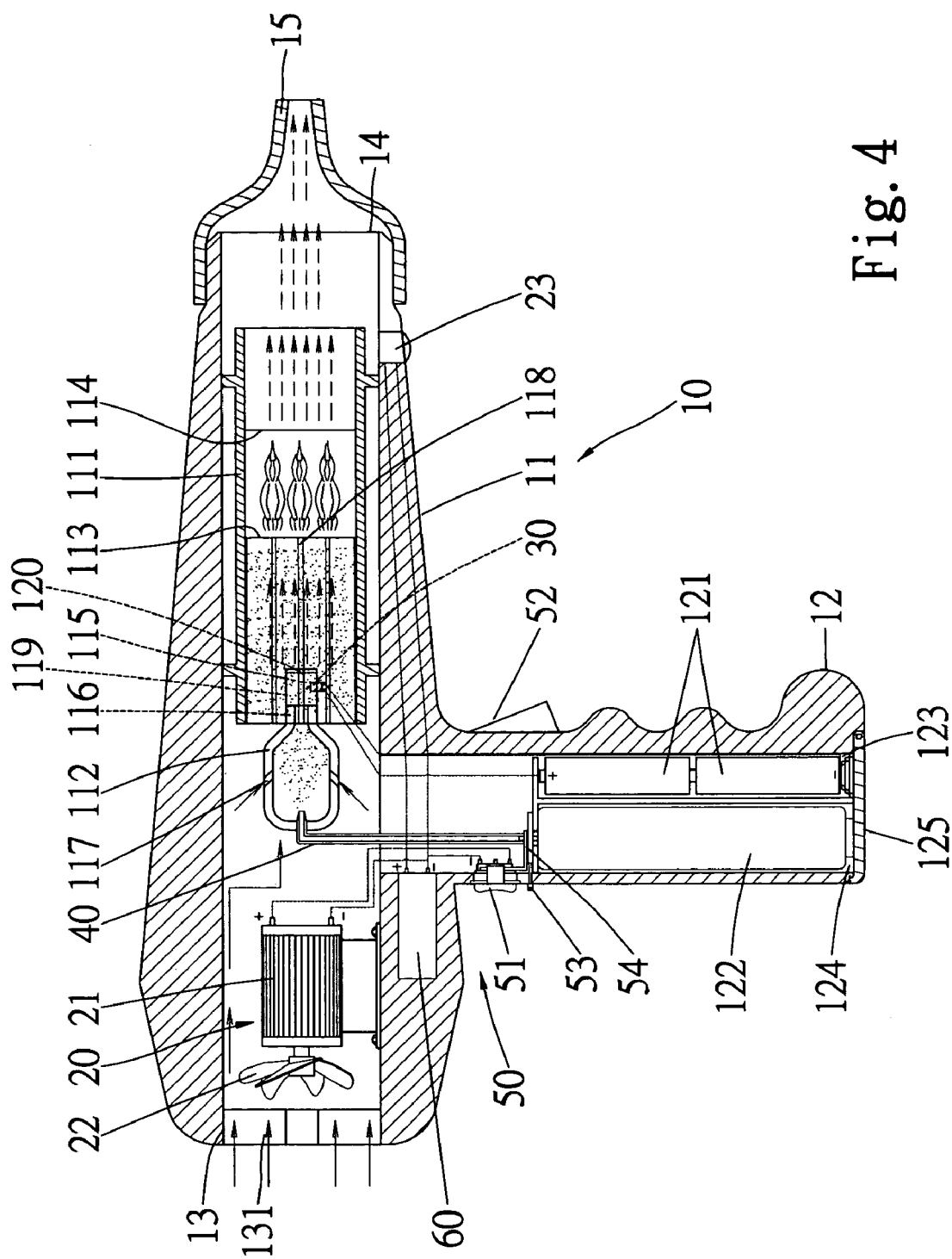
FIG. 4 is a cross-sectional view of the present invention.
Figure 5:
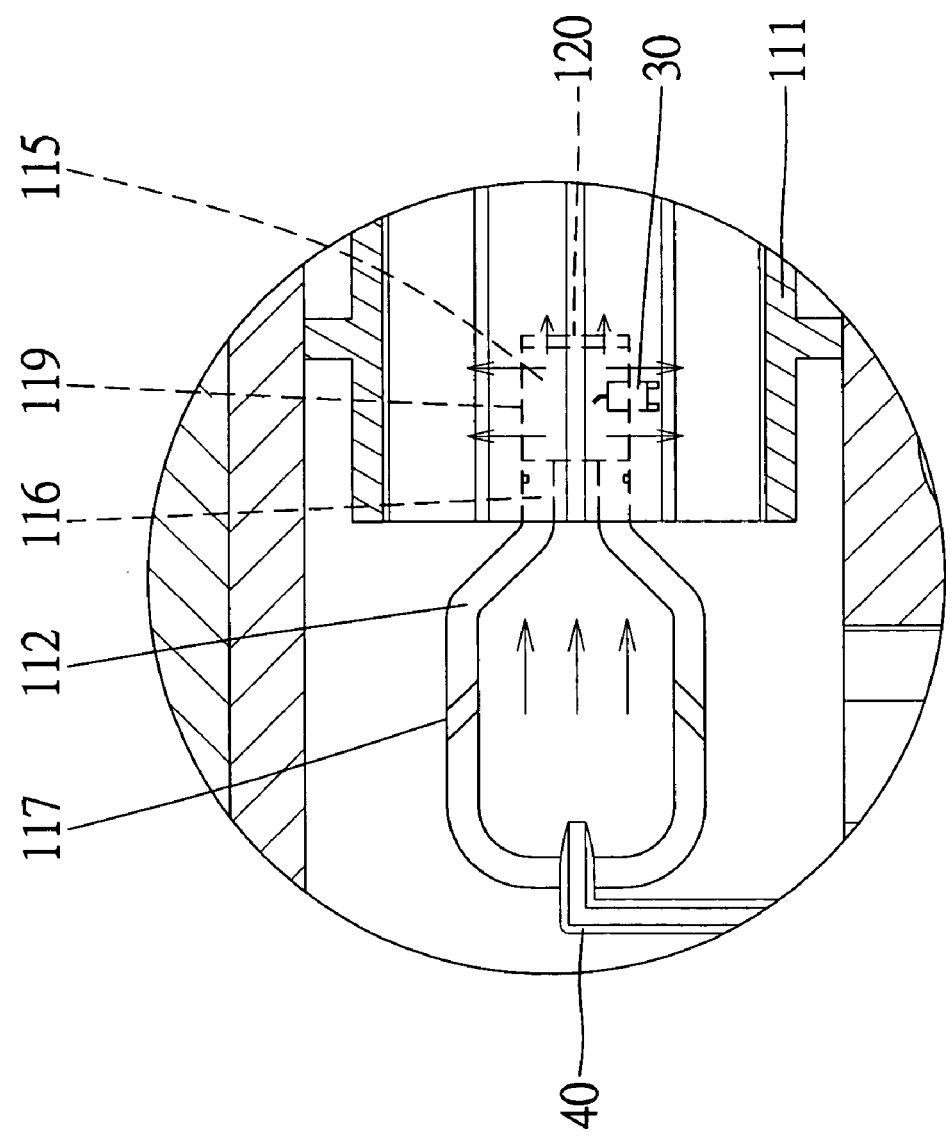
FIG. 5 is a cross-sectional view of the present invention.

Referring to FIG. 4, when the power switch 51 is pressed on, the safety switch 60 is activated. The safety switch 60 turns on the control rod 52 to open the gas can 122, and the gas sprays out from the nozzle 40. At the same time, the safety switch 60 activates the blower 20 to blow air from the intake 13 into the mixing chamber 112 to mix the gas and the air blown in. When the mixed gas passes through the shrink 116 and due to the shrinking diameter of the shrink 116, the mixed gas is compressed so that the mixed air sprays out the shrink 116 at a faster speed. The high speed injected mixed air entering the burning chamber 115 of the metal slice 113 flows to the tube shaped metal net 119 that guides the flow direction of the mixed gas (referring to FIG. 5) which is blocked by the thicker metal net 120 on the front of the tube shaped metal net 119 and the tube shaped metal net 119 itself. Since, the net holes of the thicker metal net 120 is smaller, the mixed gas is blocked effectively to have most of the mixed gas sprayed out in all directions. When the ignition switch 53 is pressed, the ignition device 30 ignites the mixed gas and generates the flame forming the first burn. The flame expands several tongues of flames from the burning chamber 115 to surround the metal slice 113 and have the temperature of the metal slice 113 rise gradually. Due to the better heat exchange rate of the metal slice 113 and when the air flow sent by the blower 20 passes through the passages 118 of the metal slice 113, air flow can bring the heat on the metal slice 113 to generate hot air. When the hot air passes through the catalyst 114, the catalyst 114 burns the small quantity left-over gas to reduce the quantity of carbon monoxide (CO) and that forms the second burning. After two forms of burning, the air temperature is higher, and the air is safer as the catalyst 114 avoids the burning flame in the metal slice 113 from coming out of the exhalation hole 14.

The mixed gas needs to have a good ratio of fresh air and gas to be properly burnt. When oxygen contained is too low in the mixed gas, the inhalation holes 117 around the burning chamber 115 offer fresh air. The diameter of the shrink 116 of the mixing chamber 112 shrinks gradually so that fresh air sucked in is mixed with gas and enters the burning chamber 115 to be burnt stably. The quantity of gas can also be controlled by the regulation valve 54. Since the metal slice 113 inside the heating chamber 111 has very good heat conductivity, the temperature of the metal slice 113 is lifted rapidly after the ignition inside the burning chamber 115. If the gas in the heating chamber 111 is not burnt properly, the toxic carbon monoxide is generated and is harmful to human body. In order to achieve complete burning, the catalyst 114 can achieve such purpose. Specifically, the catalyst 114 reacts with the burning gas and generates non-toxic carbon dioxide. The catalyst 114 can also prevent the flame from coming out of the exhalation hole 14.

When the following situations happen, the safety switch 60 elaborates the proper function. When power switch 51 is on without flame or gas burning stops, the temperature sensor 23 installed on the barrel 11 near the heating chamber 111 detects the temperature did not reach the expected temperature. Thus, the safety switch 60 stops all the signals to make the motor 21 stop, and the control rod 52 breaks away to stop the gas. When the temperature sensor 23 detects abnormally high temperature, the safety switch 60 has the control rod 52 stop the gas and have the motor 21 turn on to blow air until the temperature drops. When temperature sensor 23 detects the temperature remains high after the power switch 51 is off, the safety switch 60 has the nozzle 40 stop spraying gas and turns on the blower 20. The blower 20 keeps blowing fresh air to cool the temperature of the heating chamber 111, and the metal slice 113 absorbs the cold fresh air to lower the temperature of the heating chamber 111 due to its good heat conductivity. When the temperature sensor 23 detects the temperature of the heating chamber 111 reached a lower temperature, the blower 20 is turned off. Such design makes the present invention easier to carry without the danger of burning.

Figure 6:
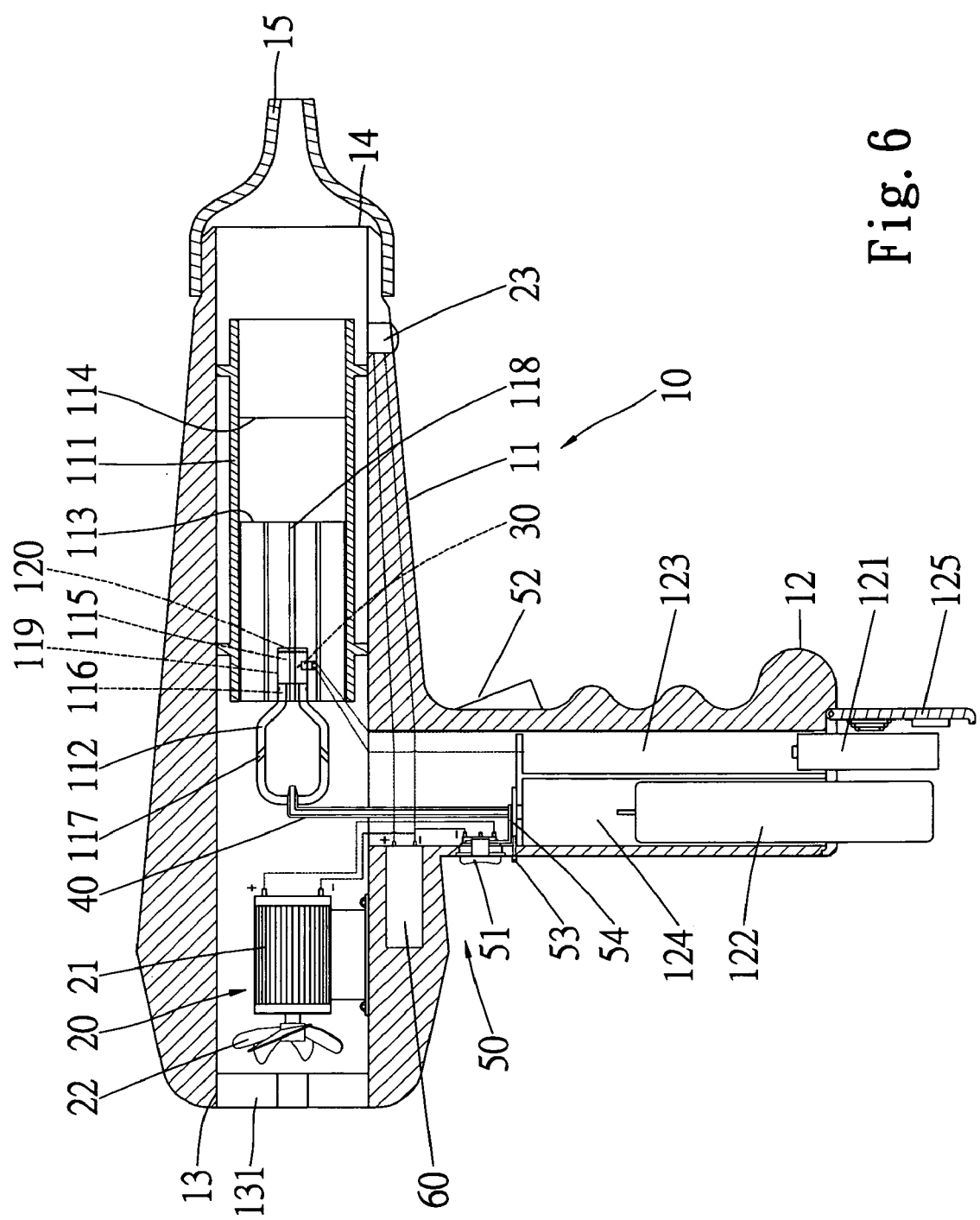
FIG. 6 is a cross-sectional view of the present invention.

Referring to FIG. 6, when the safety switch 60 detects the battery set 121 in low battery condition or gas can 122 has insufficient gas to introduce the burning temperature drop, the safety switch 60 blocks all the signals to stop all operations. A new battery set 121 or gas can 122 can be replaced. Replacement is very convenient as users only need to lift the movable cover 125 and take the battery set 121 or gas can 122 out from the first or the second container 123, 124, respectively, and do the replacement. The gas can 122 can be the re-fill type can. The present invention applies gas to generate high temperature to avoid the troubles of a power cord and to reduce space. Users can carry the present invention around very conveniently.

While a preferred embodiment of the invention has been shown and described in detail, it will be readily understood and appreciated that numerous omissions, changes and additions may be made without departing from the spirit and scope of the invention.

What is claimed is:

1. A gas hot air gun comprising:
   a blower;
   a nozzle;
   a main body including a barrel and a handle, with a heating chamber and a mixing chamber in said barrel, and a battery set and a gas can inside said handle, wherein the gas can contains burnable fluid;
   an ignition device installed inside said barrel; and
   a switch set installed inside said main body, said switch set including a power switch and an ignition switch, and a safety switch connected to said switch set electrically, wherein said safety switch closes power of said battery set or gas flow of said gas can under pre-set conditions, when said power switch is pressed, gas is sprayed out from said nozzle into said mixing chamber to mix with air and sent to said heating chamber, wherein said ignition switch has said ignition device ignite the mixed gas and air and generate heat, said blower blows hot air inside said heating chamber out, wherein a metal slice is inside said heating chamber, with the metal slice having a good heat exchange rate and heat conductivity to be heated up and cooled down rapidly, said metal slice also has air flow direction regulation effect, with the metal slice including an axially extending burning chamber, with the metal slice further including a plurality of lobes, with the lobes and the main body defining a plurality of passages radially spaced from and circumferentially spaced around the burning chamber.

2. The gas hot air gun according to claim 1 wherein several intakes are installed on an end of said barrel for fresh air to come in.

3. The gas hot air gun according to claim 1 wherein a holder is installed on a front of said barrel for faster heating effect.

4. The gas hot air gun according to claim 1 wherein a first and a second container are installed in said handle to hold the battery set in said first container and the gas can in said second container.

5. The gas hot air gun according to claim 1 wherein said switch set contains a regulation valve.

6. The gas hot air gun according to claim 1 wherein said switch set is installed on said handle of said main body.

7. The gas hot air gun according to claim 1 wherein said power switch connects to the battery set and said blower with electrical wires.

8. The gas hot air gun according to claim 1 wherein said ignition switch connects to said ignition device.

9. The gas hot air gun according to claim 1 wherein said heating chamber interlinks to said mixing chamber.

10. The gas hot air gun according to claim 1 wherein said heating chamber is installed on a front of said barrel, said mixing chamber is installed on said heating chamber near an end of said barrel.

11. The gas hot air gun according to claim 1 wherein a shrink is formed on said mixing chamber near said heating chamber, wherein a diameter of said shrink is smaller on an end of the shrink opposite to said nozzle, with the nozzle located in the mixing chamber opposite to and aligned with the end of the shrink.

12. The gas hot air gun according to claim 11, wherein air inhalation holes are provided around said mixing chamber for fresh air to come in to achieve better gas-air ratio, with the air inhalation holes located intermediate the nozzle and the shrink.

13. The gas hot air gun according to claim 1 wherein a catalyst is installed in said heating chamber to help gas burn completely and reduce the generation of carbon monoxide to lift temperature and avoid flame coming out.

14. The gas hot air gun according to claim 1 wherein a burning chamber is installed on one end of said metal slice, said burning chamber interlinks to said mixing chamber.

15. The gas hot air gun according to claim 14 wherein said ignition device is installed inside said burning chamber.

16. The gas hot air gun according to claim 1 wherein said blower comprises a motor and a fan blade, with said motor located near a front side of said barrel, with the fan blade installed near an end of said barrel, wherein said blower comprises a temperature sensor, with said temperature sensor installed around said barrel near said heating chamber, with said temperature sensor keeping said motor turning after said power switch is off, but when the temperature of said heating chamber goes below a certain temperature, said temperature sensor stops said motor from turning.

17. The gas hot air gun according to claim 1 wherein said nozzle is installed in said barrel of said main body between said blower and said mixing chamber.

18. The gas hot air gun according to claim 12 with the end of the shrink extending into the burning chamber of the metal slice.

19. The gas hot air gun according to claim 18 further comprising a first, tube shaped, metal net having first and second sides, with the first side of the first, tube shaped metal net located on the end of the shrink; and a second metal net located on the second side of the first, tube shaped, metal net, with the first side of the first, tube shaped, metal net located intermediate the second side of the first, tube shaped, metal net and the nozzle, with the first and second metal nets located in the burning chamber of the metal slice.

20. The gas hot air gun according to claim 19 with the second metal net having smaller holes than the first, tube shaped, metal net.

21. The gas hot air gun according to claim 1 further comprising a first, tube shaped, metal net having first and second sides; and a second metal net located on the second side of the first, tube shaped, metal net, with the first side of the first, tube shaped, metal net located intermediate the second side of the first, tube shaped, metal net and the nozzle, with the first and second metal nets located in the burning chamber of the metal slice.

22. The gas hot air gun according to claim 21 with the second metal net having smaller holes than the first, tube shaped, metal net.

* * * * *